United States Patent
Kim et al.

(10) Patent No.: US 8,081,286 B2
(45) Date of Patent: Dec. 20, 2011

(54) LIQUID CRYSTAL DISPLAY DEVICE HAVING FIRST COLUMN SPACER CORRESPONDS TO A TFT AND A SECOND COLUMN SPACER CORRESPONDS TO A STORAGE CAPACITOR

(75) Inventors: Pyung Hun Kim, Gyeongsangbuk-do (KR); Young Hoon Lee, Seoul (KR); Jae Wook Kim, Gwangju (KR)

(73) Assignee: LG Display Co., Ltd., Seoul (KR)

( * ) Notice: Subject to any disclaimer, the term of this patent is extended or adjusted under 35 U.S.C. 154(b) by 240 days.

(21) Appl. No.: 11/303,994

(22) Filed: Dec. 19, 2005

(65) Prior Publication Data

US 2007/0002263 A1    Jan. 4, 2007

(30) Foreign Application Priority Data

Jun. 30, 2005    (KR) .......................... 10-2005-0058005

(51) Int. Cl.
*G02F 1/1335*    (2006.01)
*G02F 1/1333*    (2006.01)
*G02F 1/1339*    (2006.01)

(52) U.S. Cl. ........ 349/157; 349/106; 349/108; 349/110; 349/155; 349/156

(58) Field of Classification Search ........... 349/155–157
See application file for complete search history.

(56) References Cited

U.S. PATENT DOCUMENTS

| 6,067,144 | A * | 5/2000 | Murouchi ...................... 349/156 |
| 6,414,733 | B1 * | 7/2002 | Ishikawa et al. .............. 349/110 |
| 6,493,050 | B1 | 12/2002 | Lien et al. |
| 6,677,613 | B1 * | 1/2004 | Yamazaki et al. .............. 257/72 |
| 2001/0026347 | A1 * | 10/2001 | Sawasaki et al. ............. 349/156 |
| 2002/0003519 | A1 | 1/2002 | Kim |
| 2003/0151716 | A1 * | 8/2003 | Yanagawa et al. ............ 349/155 |
| 2004/0114087 | A1 * | 6/2004 | Cho et al. ....................... 349/155 |
| 2004/0183989 | A1 * | 9/2004 | Kim et al. ...................... 349/155 |
| 2004/0196421 | A1 | 10/2004 | Kwang |
| 2005/0024567 | A1 * | 2/2005 | Sawasaki et al. ............. 349/123 |

FOREIGN PATENT DOCUMENTS

| CN | 1294310 | 5/2001 |
| JP | 10-062789 | 3/1998 |
| JP | 10-186408 | 7/1998 |
| JP | 11-109411 | 4/1999 |
| JP | 2001-091727 | 4/2001 |
| JP | 2001-201750 | 7/2001 |
| JP | 2002-090751 | 3/2002 |
| JP | 2003-075808 | 3/2003 |
| JP | 2004-205549 | 7/2004 |
| JP | 2005-107494 | 4/2005 |
| KR | 10-2004-0085797 | 8/2004 |

\* cited by examiner

*Primary Examiner* — Lauren Nguyen

(74) *Attorney, Agent, or Firm* — Morgan, Lewis & Bockius LLP

(57) ABSTRACT

A liquid crystal display panel includes a color filter array substrate having a first column spacer and a second column spacer, the first column spacer being partially inserted in a first hole, and a thin film transistor (TFT) array substrate facing the color filter array substrate having a protective passivation film.

8 Claims, 15 Drawing Sheets

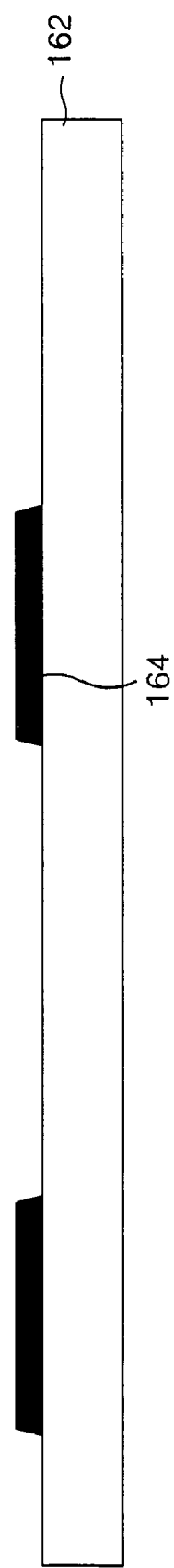

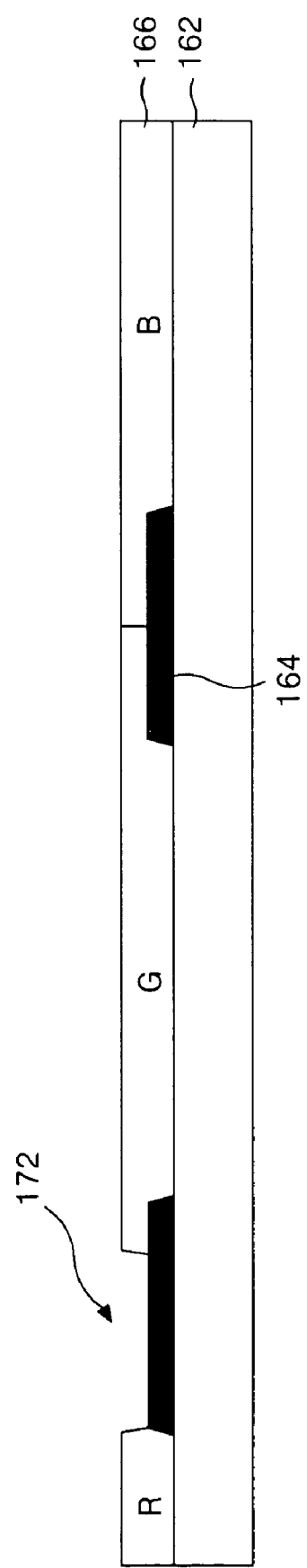

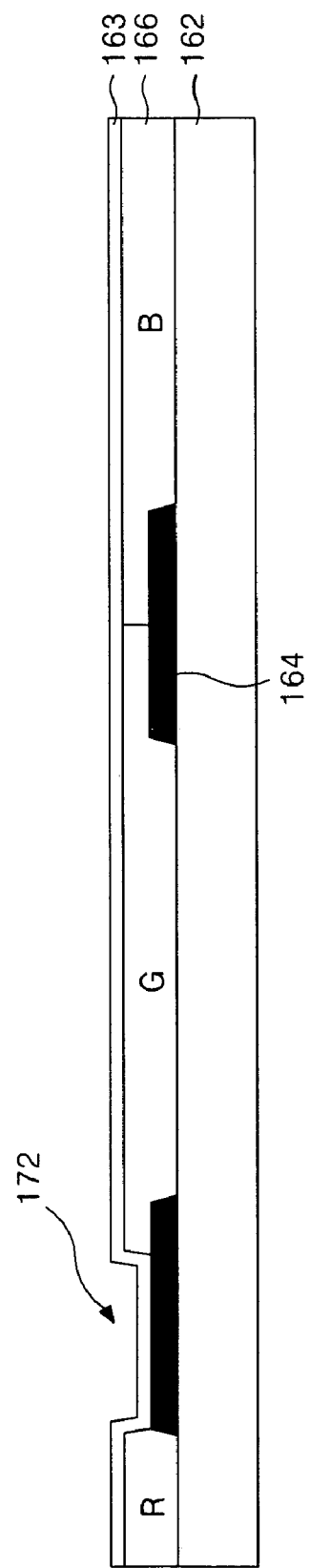

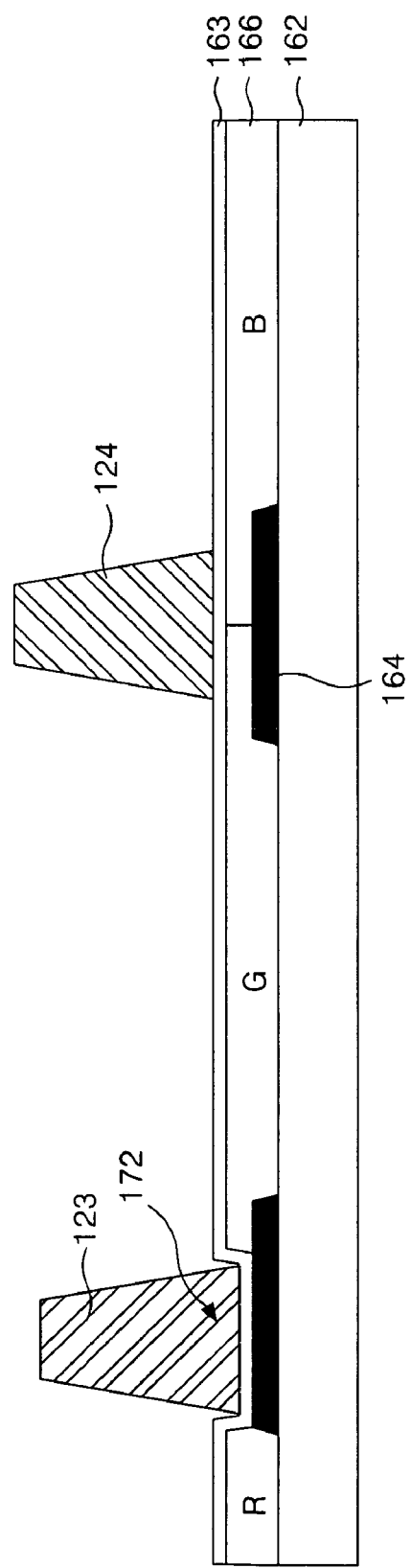

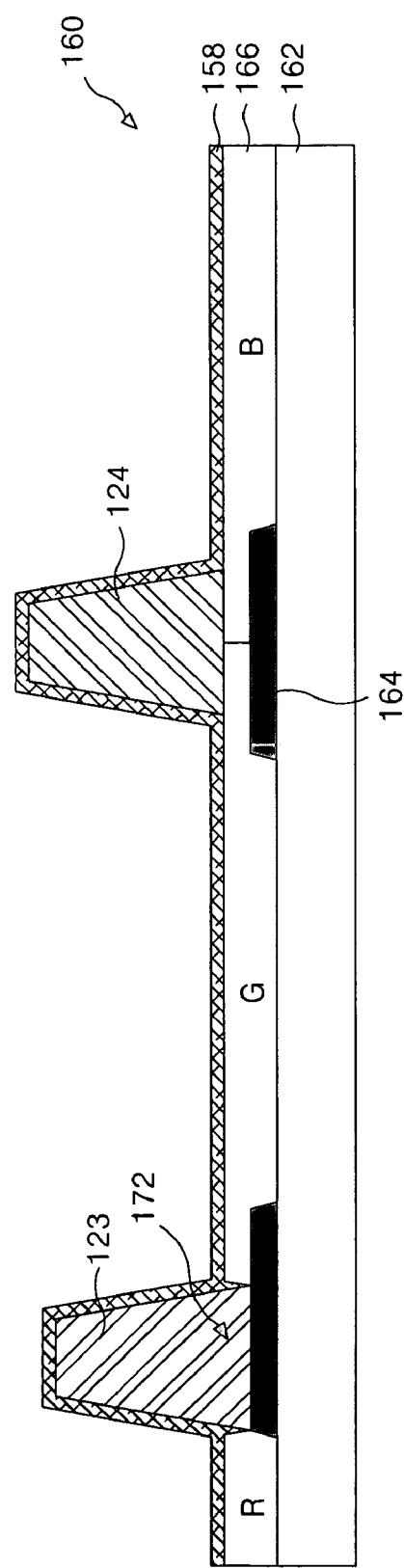

d2 − d1 ≒ d3 ( d2 > d1 )

d2 − d1 ≒ d3 ( d2 > d1 )

LIQUID CRYSTAL DISPLAY DEVICE HAVING FIRST COLUMN SPACER CORRESPONDS TO A TFT AND A SECOND COLUMN SPACER CORRESPONDS TO A STORAGE CAPACITOR

This application claims the benefit of the Korean Patent Application No. P2005-0058005 filed on Jun. 30, 2005, which is hereby incorporated by reference.

BACKGROUND OF THE INVENTION

1. Field of the Invention

The present invention relates to a liquid crystal display (LCD) panel, and more particularly, to an LCD panel and a fabricating method thereof that is adapted for improved reliability of keeping a cell gap by preventing defects caused by expansion of liquid crystal materials.

2. Discussion of the Related Art

Generally, a liquid crystal display (LCD) device controls light transmittance by applying an electric field to a liquid crystal layer, thereby displaying a picture. To this end, the LCD device includes an LCD panel having liquid crystal cells arranged in a matrix shape and a drive circuit to drive the LCD panel. The LCD panel includes a thin film transistor (TFT) array substrate and a color filter array substrate arranged to face each other, a spacer arranged to keep a fixed cell gap between the two substrates, and a liquid crystal material filled in the cell gap.

Various types of structures for the LCD panel have been proposed within the past few years to solve a specific problem. Specially, a spacer in the LCD panel provide a specified cell gap between the TFT array substrate and the color filter array substrate. However, reliability of maintaining the cell gap is reduced as the liquid crystals in the gap expand when exposed to high temperatures. To solve such a problem, a dual spacer structure for the LCD panel has been proposed recently.

FIG. 1 is a plan view representing an LCD panel adopting a dual spacer structure of the related art. As shown in FIG. 1, the LCD panel is centered around a TFT array substrate and a column spacer. FIG. 2A is a cross sectional view illustrating the TFT array substrate taken along line I-I' of FIG. 1, and FIG. 2B is a cross sectional view illustrating the TFT array substrate taken along line II-II'.

The LCD panel shown in FIGS. 1, 2A, and 2B includes a color filter array substrate 60, a TFT array substrate 70, and a liquid crystal material (not shown) injected into an inner space between the color filter array substrate 60 and the TFT array substrate 70. The color filter array substrate 60 includes a black matrix 64, a color filter 66, a main column spacer 24, an auxiliary column spacer 23, and an upper alignment film 58 formed on an upper substrate 62. The TFT array substrate 70 includes a thin film transistor 6, a pixel electrode 18, and a lower alignment film 52 formed on a lower substrate 42.

In the color filter array substrate 60, the black matrix 64 is formed on the upper substrate 62 in areas corresponding to gate lines 2, data lines 4, and TFTs 6 formed on the lower substrate 42, and provides a cell area where the color filter 66 is to be formed. The black matrix 64 prevents light leakage and absorbs external light, thereby increasing contrast. A common electrode (not shown) can be formed on the color filter 66 in a TN (twisted nematic) mode, which uses a vertical direction electric field. In contrast, a common electrode (not shown) can be formed on the TFT array substrate 70 in an IPS (in-plane switch) mode, which uses a horizontal direction electric field.

The TFT array substrate 70 includes a gate line 2 and a data line 4 formed on the lower substrate 42 to cross each other with a gate insulating film 44 therebetween, a TFT 6 formed at each crossing part, and a pixel electrode 18 formed in a cell area defined by the crossing structure. The TFT array substrate 70 also includes a storage capacitor formed in an overlap portion of the gate line 2 and a next-stage pixel electrode 18. (FIG. 1 shows a storage capacitor 20 of the next pixel area.)

The TFT 6 includes a gate electrode 8 connected to the gate line 2, a source electrode 10 connected to the data line 4, a drain electrode 12 connected to the pixel electrode 18, and an active layer 14 formed over the gate electrode 8 with a channel between the source electrode 10 and the drain electrode 12. The active layer 14 is overlapped with the data line 4 and the source and drain electrodes 10, 12, and includes a channel part between the source electrode 10 and the drain electrode 12. An ohmic contact layer 47 is further formed on the active layer 14 for being in ohmic contact with the data line 4 and the source and drain electrodes 10, 12. The active layer 114 and the ohmic contact layer 147 defines a semiconductor pattern 48.

In the TFT 6, a pixel voltage signal supplied to the data line 4 charges the pixel electrode 18 in response to a gate signal supplied to the gate line 2. To this end, the pixel electrode 18 is connected to the drain electrode 12 of the TFT 6 through a contact hole 17 that penetrates a passivation film 50. The pixel electrode 18 generates a potential difference with the common electrode (not shown). The potential difference causes liquid crystals, which are located between the TFT array substrate 70 and the color filter array substrate 60, to rotate by dielectric anisotropy. The rotation of the liquid crystals transmits light, which is incident through the pixel electrode 18 from a light source (not shown), to the upper substrate.

The storage capacitor 20 shown in FIG. 1 is actually a storage capacitor for the next stage pixel. Hence, the storage capacitor 20 includes a pre-stage gate line 2 and a pixel electrode 18 (partially shown) that overlaps the pre-stage gate line 2 with the gate insulating film 44 and the passivation film 50 formed therebetween. The storage capacitor 20 helps the pixel voltage, which is charged in the pixel electrode 18, to be kept until the next pixel voltage is charged.

The main column spacer 24 is located in an area overlapping the storage capacitor 20, and the auxiliary column spacer 23 is located in an area overlapping the gate line 2. Further, the main column spacer 24 and the auxiliary column spacer 23 are located to overlap the black matrix 64 of the color filter array substrate 60.

The main column spacer 24 is in contact with the TFT array substrate 70 to maintain a cell gap. To this end, the storage capacitor 20 located in a lower part of the main column spacer 24 and is defined by a stepped difference formed by an upper storage electrode 54 made of the source/drain pattern and the semiconductor pattern.

The auxiliary column spacer 23 is arranged to float above the TFT array substrate 70 at ordinary times and acts to prevent a defect that is generated when liquid crystals expand. Additionally, when an external pressure is applied to the substrates, the auxiliary column spacer 23 comes in contact with the TFT array substrate 70, thereby reinforcing the main column spacer 24 to maintain the cell gap.

In the LCD panel having the dual spacer structure of the related art, if the passivation film 50 of the TFT array substrate 70 is formed of an organic material such as photo-acryl, the dual spacer structure does not perform its function properly. For instance, the LCD panel shown in FIG. 3 has the passivation film 50 of the TFT array substrate 70 formed of an organic material. When the passivation film 50 is formed with an organic material, no stepped difference is generated within the TFT array substrate 70. Hence, there is no height difference between the main column spacer 24 and the auxiliary column spacer 23. As a result, in the LCD panel adopting the organic passivation film 50 of the related art, the advantages of preventing a defect from liquid crystal expansion and increased reliability of the cell obtained from using the dual spacer structure are lost.

SUMMARY OF THE INVENTION

Accordingly, the present invention is directed to a liquid crystal display (LCD) panel that substantially obviates one or more problems due to limitations and disadvantages of the related art.

An object of the present invention is to provide an LCD panel that is adapted to improve reliability of keeping a cell gap and preventing defects caused by a liquid crystal expansion.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display panel includes a color filter array substrate having a first column spacer and a second column spacer, the first column spacer being partially inserted in a first hole, and a thin film transistor (TFT) array substrate facing the color filter array substrate having a protective passivation film.

In another aspect, a fabricating method of a liquid crystal display panel includes forming a color filter array substrate having a first column spacer and a second column spacer, the first column spacer being partially inserted in a first hole, forming a thin film transistor (TFT) array substrate having a protective organic passivation film, and attaching the color filter array substrate with the TFT array substrate such that the second.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 6A to 6E are diagrams for explaining an exemplary fabricating method of a color filter array substrate of the LCD panel of the present invention;

DETAILED DESCRIPTION OF THE PREFERRED EMBODIMENTS

Reference will now be made in detail to the preferred embodiments of the present invention, examples of which are illustrated in the accompanying drawings.

Figure 1:
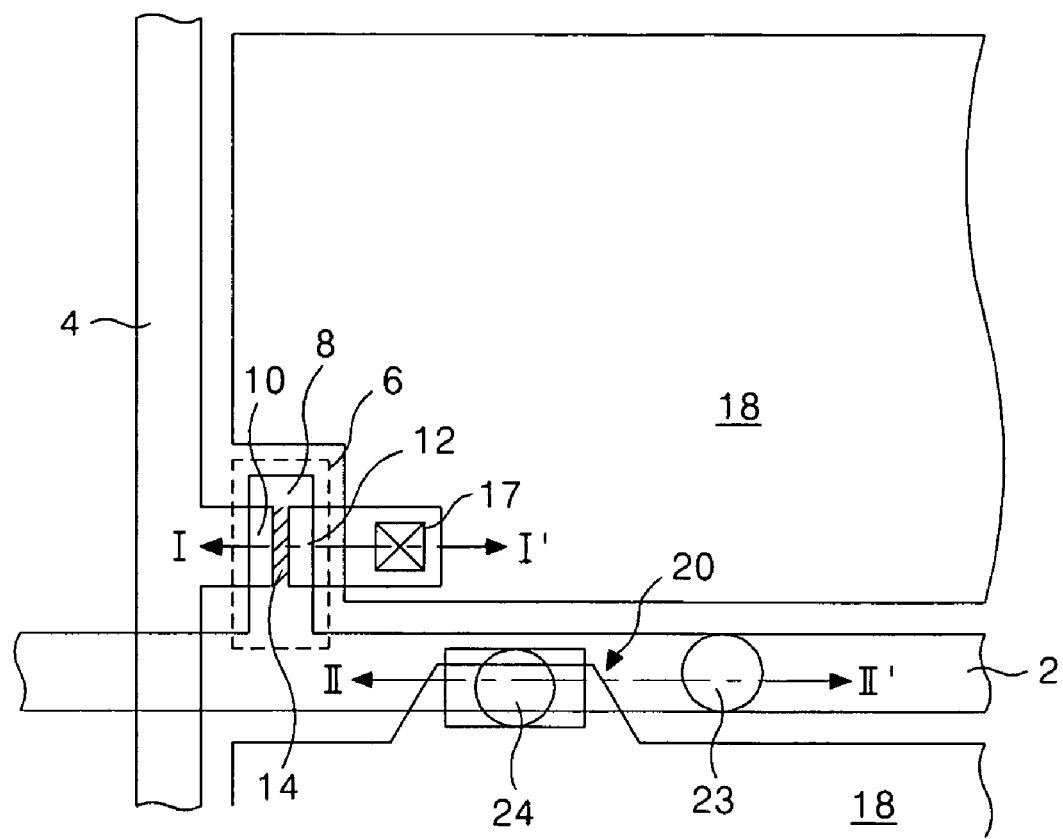
FIG. 1 a plan view representing a liquid crystal display (LCD) panel adopting a dual spacer structure of the related art.
Figure 2A:
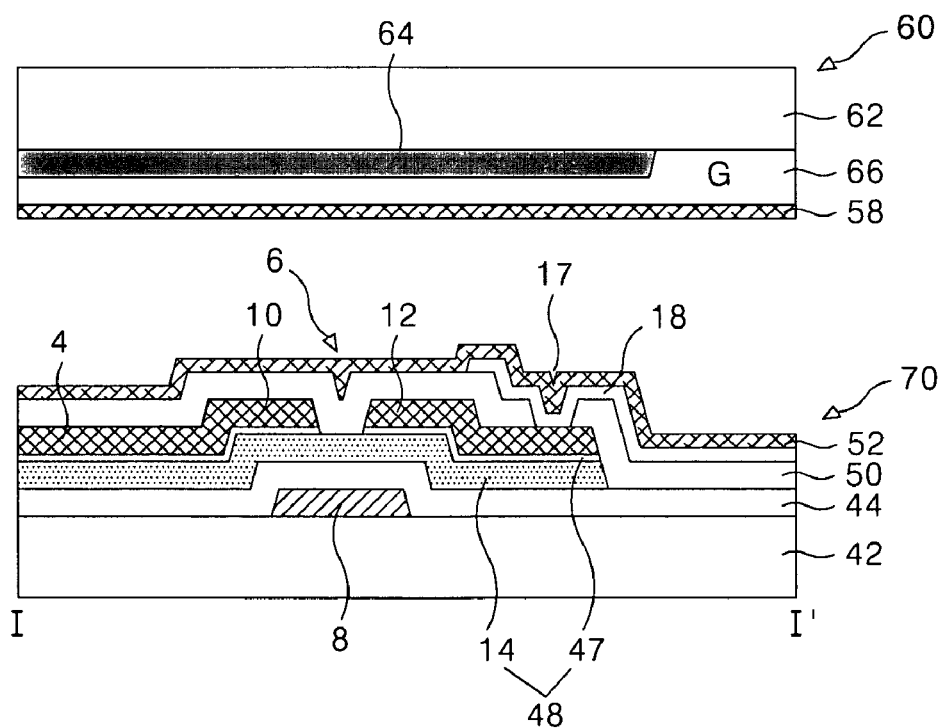
FIGS. 2A and 2B are cross sectional diagrams along lines I-I' and II-II' of FIG. 1, respectively.
Figure 2B:
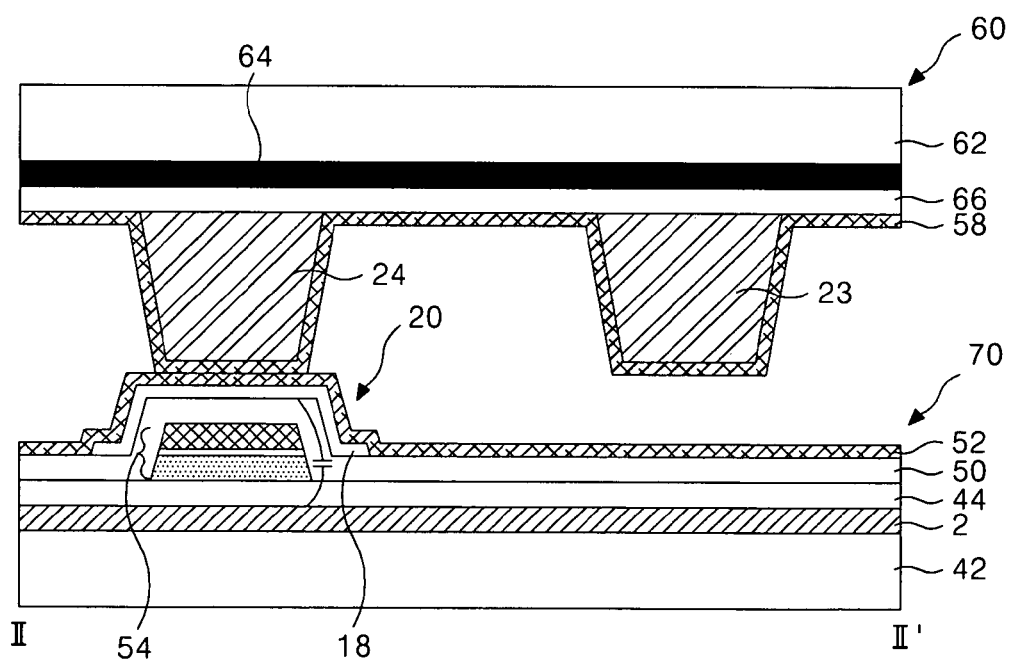
Figure 3:
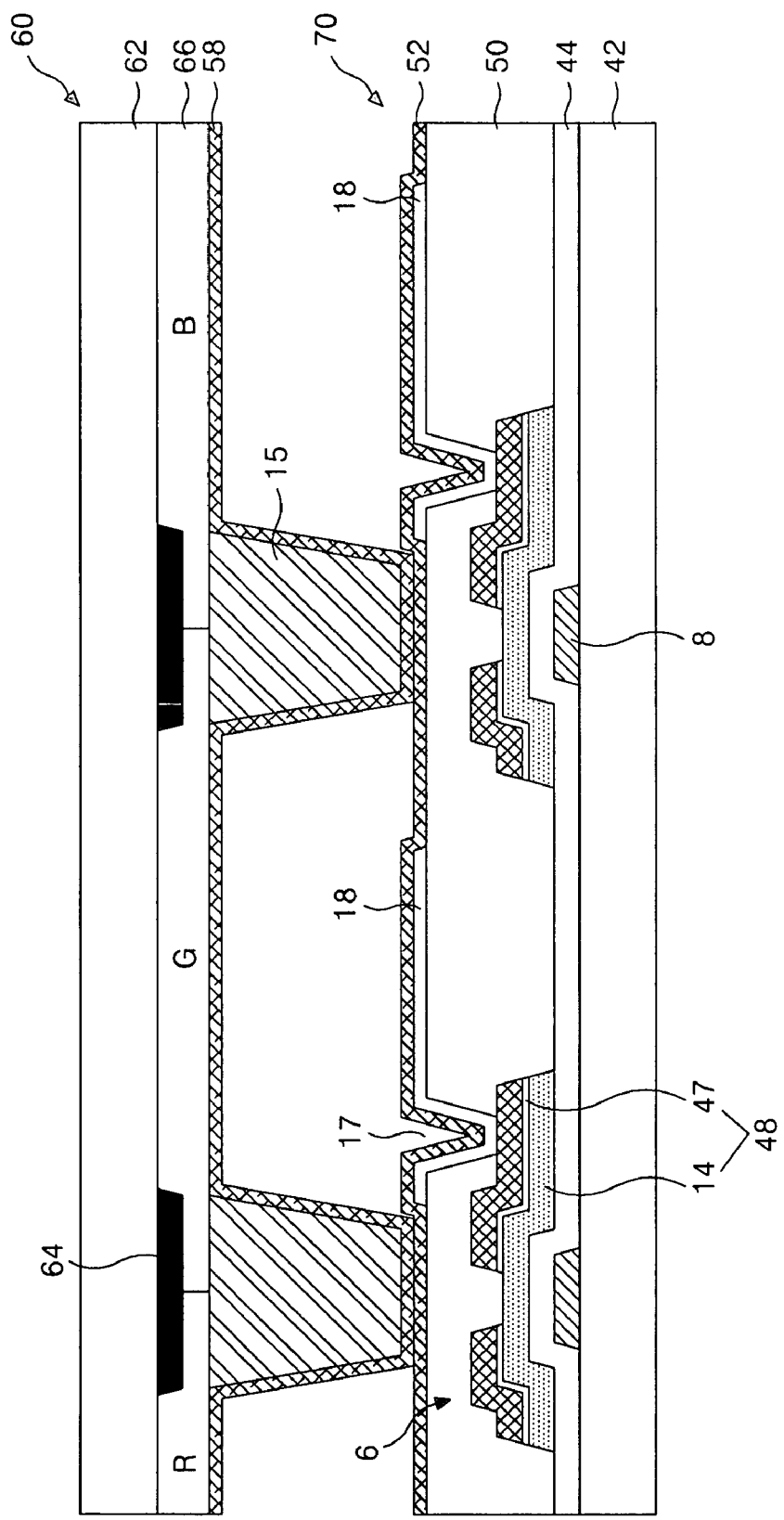
FIG. 3 is a diagram representing an LCD panel having an organic passivation film of the related art.
Figure 4:
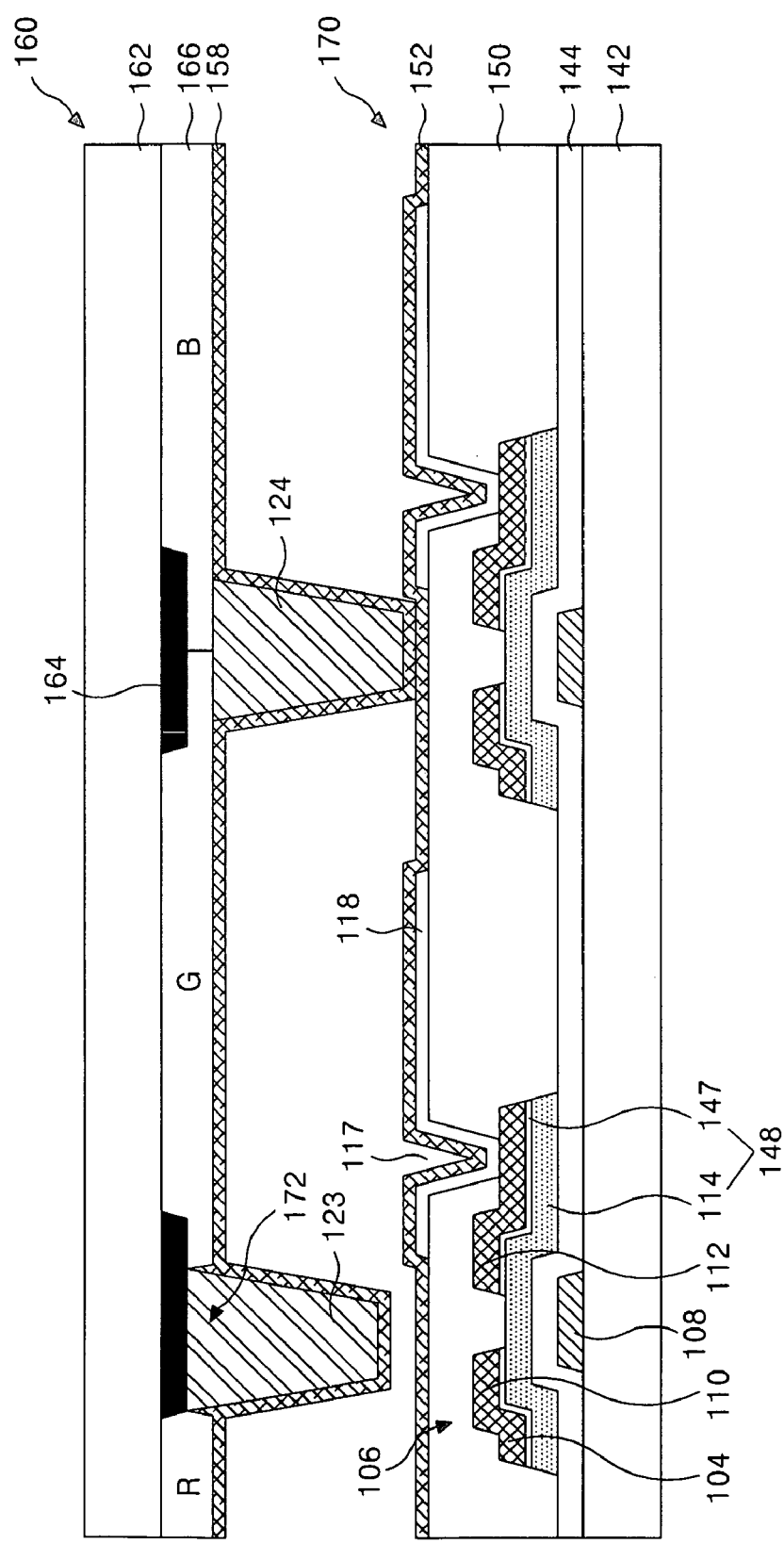
FIG. 4 is a diagram representing an LCD panel according to a first exemplary embodiment of the present invention.

FIG. 4 is a cross sectional diagram representing a liquid crystal display (LCD) panel according to a first exemplary embodiment of the present invention. The LCD panel shown in FIG. 4 includes a color filter array substrate 160 and a TFT array substrate 170 arranged to face each other with a main column spacer 124 and an auxiliary column spacer 123 therebetween. The TFT substrate 170 includes a gate line (not shown) and a data line 104 formed on a lower substrate 142 to cross each other with a gate insulating pattern 144 therebetween, a TFT 106 formed at each crossing part, and a pixel electrode 118 formed in a cell area wdefined by the crossing structure.

The TFT 106 includes a gate electrode 108 connected to the gate line, a source electrode 110 connected to the data line 104, a drain electrode 112 connected to a pixel electrode 118, and an active layer 114 overlapping the gate electrode 108 with a channel formed between the source electrode 110 and the drain electrode 112. The active layer 114 is formed to be overlapped by the data line 104, the source electrode 110, and the drain electrode 112 and includes a channel part between the source electrode 110 and the drain electrode 112. An ohmic contact layer 147 is formed on the active layer 114 for being in ohmic contact with the data line 104, the source electrode 110, and the drain electrode 112. The active layer 114 and the ohmic contact layer 147 define a semiconductor pattern 148.

In the TFT 106, a pixel voltage signal supplied to the data line 104 charges the pixel electrode 118 in response to a gate signal supplied to the gate line 102. To this end, the pixel electrode 118 is connected to the drain electrode 112 of the TFT 106 through a first contact hole 117 penetrating a passivation film 150. The pixel electrode 118 generates a potential difference with a common electrode (not shown) by the charged pixel voltage. The potential difference causes liquid crystals located between the TFT array substrate 170 and the color filter array substrate 160 to rotate by dielectric anisotropy, thereby allowing light, which is incident through the pixel electrode 118 from a light source (not shown), to be transmitted to the upper substrate.

The color filter array substrate 160 includes a black matrix 164 that defines a cell area where a color filter 166 is to be formed on an upper substrate 162. The color filter 166 is formed in the cell area divided by the black matrix 164. A main column spacer 124 is formed on the color filter 166 and the black matrix 164 while an auxiliary column spacer 123 is formed on the black matrix 164. An upper alignment film 158 is formed on the entire surface of the upper substrate 162.

The black matrix 164 is formed on the upper substrate 162 in correspondence to areas of the data lines (not shown), the gate lines (not shown), and the TFT 106 area of the lower substrate 142, and provides a cell area where the color filter 166 is to be formed. The black matrix 164 prevents light leakage and absorbs external light, thereby increasing contrast. The color filter 166 is formed in the cell area divided by the black matrix 164. The common electrode (not shown) may be formed on the color filter in a TN (twisted nematic) mode, which uses a vertical direction electric field. In contrast, the common electrode (not shown) may be formed in the TFT array substrate in case of an IPS (in-plane switch) mode, which uses a horizontal direction electric field. According, in the TN mode, a common electrode may be formed between the color filter and the column spacers 123 and 124.

The main column spacer 124 is in contact with the TFT array substrate 170, thereby maintaining a cell gap. On the other hand, the auxiliary column spacer 123 is arranged to float above the TFT array substrate 170 with a designated distance therebetween at ordinary times and acts to prevent a defect that is generated when liquid crystals expand. Additionally, when an external pressure is applied to the substrates, the auxiliary column spacer 123 comes in contact with the TFT array substrate 170, thereby reinforcing the main column spacer 124 to maintain the cell gap. To this end, a designated first hole 172 is provided on the color filter array substrate 160, and the auxiliary column spacer 123 is partially formed in the first hole 172.

Figure 5:
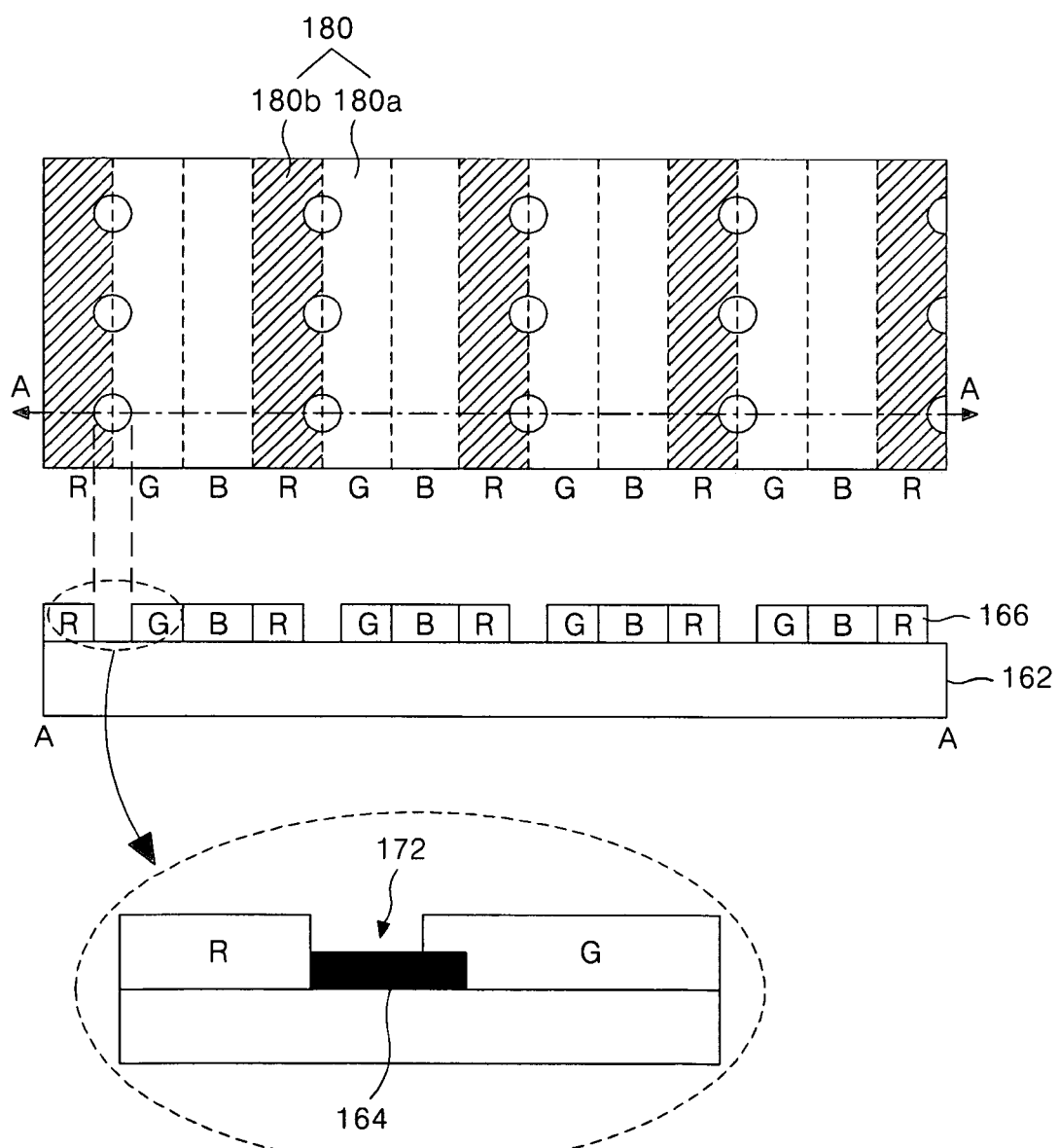
FIG. 5 is a diagram representing an exemplary mask used when forming a red color filter of FIG. 4.

More specifically, the first hole 172 is formed in an area of the color filter 166, for example, on the red (R) color filter, where the auxiliary column spacer 123 is to be formed. As shown in FIG. 5, a photolithography process is performed by using a mask 180. The mask 180 includes a shielding part 180*b* that intercepts light in an area where the red (R) color filter is to be formed, and a transmission part 180*a* that transmits light in an area other than the area where the auxiliary column spacer 123 and the red R color filter are to be formed. Accordingly, the red (R) color filter is formed with a groove 172 that exposes the black matrix 164 in the adjacent area to the red (R) color filter. Thereafter, the photolithography processes for forming the green (G) and blue (B) color filters are performed, respectively, thereby forming the color filter 166 with the groove 172, as shown in FIG. 5.

After the color filter 166 is formed according to the method described above, the common electrode (not shown), in case of the TN mode, or an overcoat layer, in case of the IPS mode, may be formed. The auxiliary column spacer 123 is then formed into the first hole 172, thereby making it possible to form the main column spacer 124 and the auxiliary column spacer 123 having different heights with respect to the surface of the upper substrate 162.

As a result, even though the organic passivation film 150 is adopted in the TFT array substrate 170, a step difference is formed within the color filter array substrate 160. Thus, the main column spacer 124 can be made to be in contact with the TFT array substrate 170 while the auxiliary column spacer 123 can be arranged to float above the TFT array substrate 170 with a designated distance therebetween. Accordingly, the LCD panel having the organic passivation film 150 can also be made with a fully functioning dual spacer structure, thereby making it possible to improve the reliability of maintaining the cell gap while preventing a defect caused by liquid crystal expansion.

An exemplary fabricating method of the LCD panel of the present invention will be explained with reference to FIGS. 6A-6E. First, after an opaque material is formed on the upper substrate 162 by a deposition method, for example, such as sputtering. The opaque material is patterned by a photolithography process and an etching process using a mask, thereby forming the black matrix 164, as shown in FIG. 6A. For purposes of example, chrome Cr, an opaque resin, can be used as the black matrix 164 material.

After a red resin is deposited on the upper substrate 162 on which the black matrix 164 is formed, the mask 180 (FIG. 5) having the transmission part 180*a* and the shielding part 180*b* is aligned over the upper substrate 162. A photolithographic process is performed using the mask 180, thereby forming the red (R) color filter with the first hole 172 exposing the black matrix 164.

Thereafter, a green resin is deposited on the upper substrate 162 where the red (R) color filter and the first hole 172 are formed. The green resin is patterned by the photolithography process and the etching process, thereby forming a green (G) color filter. Similarly, after a blue resin is deposited on the upper substrate 162 between the green (G) color filter and the red (R) color filter, the blue resin is patterned by the photolithography process and the etching process, thereby forming the blue (B) color filter. As shown in FIG. 6B, the color filter 166 having the red (R), green (G), and blue (B) color filters and the first hole 172 are formed.

In the case of the TN mode, a common electrode 163 may be formed on the color filter 166 as shown in FIG. 6C. In the case of the IPS mode, an overcoat layer 163 is formed instead of the common electrode 163. Thereafter, a spacer material is formed on the common electrode 163. Using the photolithography process and the etching process, the main column spacer 124 and the auxiliary column spacer 123 partially inserted in the first hole 172 are formed as shown in FIG. 6D.

In the alternative, the common electrode/overcoat layer 163 may be formed after the main column spacer 124 and the auxiliary column spacer 123 are formed without departing from the scope of the invention. Therefore, as shown in FIG. 6E, the main column spacer 124 and the auxiliary column spacer 123 may be formed directly on the black matrix 164 and the color filter 166. However, the common electrode/overcoat layer may also be formed between the black matrix/color filter and the column spacers without departing from the scope of the invention.

After the main column spacer 124 and the auxiliary column spacer 123 are formed, an alignment material such as polyimide, for example, is spread on the entire surface of the upper substrate 162. A rubbing process is performed on the alignment material, thereby forming the upper alignment film 158, as shown in FIG. 6E.

Figure 7:
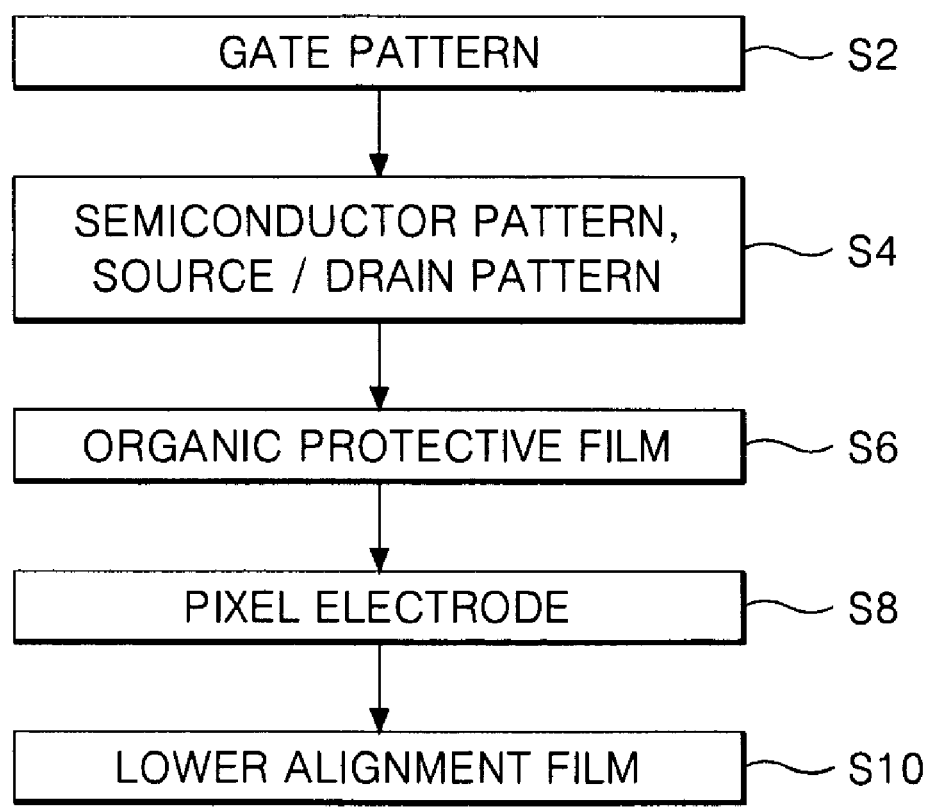
FIG. 7 is a flow chart representing an exemplary fabricating method of a thin film transistor (TFT) array substrate of the LCD panel of the present invention.

FIG. 7 is a flow chart briefly explaining the process of forming the TFT array substrate 170. First, a gate pattern such as the gate electrode 108 and the gate line (not shown) is formed on the lower substrate 142 by a photolithography process and an etching process using a mask. (S2) After forming the gate patterns, the gate insulating film 144 is formed. The semiconductor pattern 148 including of the active layer 114 and the ohmic contact layer 147 and the source/drain pattern including of the data line 104, the source electrode 110, and the drain electrode 112 formed on the semiconductor pattern 148, are formed on the gate insulating film 144 by the photolithography process and the etching process using a mask, thereby forming the TFT 106. (S4) Thereafter, an organic material is deposited on the entire surface of the lower substrate 142 after forming the TFT 106 to form the organic passivation film 150 having a contact hole 117 that exposes the drain electrode 112 of the TFT 106. (S6) A pixel electrode 118 is formed on the passivation film 150 such that the pixel electrode 118 in contact with the drain electrode 112 through the contact hole 117. (S8) The lower alignment film 152 is formed to cover the pixel electrode 118. (S10)

The TFT array substrate 170 is then bonded with the color filter array substrate 160. When the TFT array substrate 170 is brought together with the color filter array substrate 160, the main column spacer 124 comes in contact with the TFT array substrate 170 while the auxiliary column spacer 123 does not. When an external pressure is applied to the substrates, the auxiliary column spacer 123 comes in contact with the TFT array substrate 170 to reinforce the main column spacer 124 to help maintain the cell gap. Herein, the auxiliary column spacer 123 and the main column spacer 124 are arranged over the TFTs 106 of the TFT array substrate 170.

Figure 8:
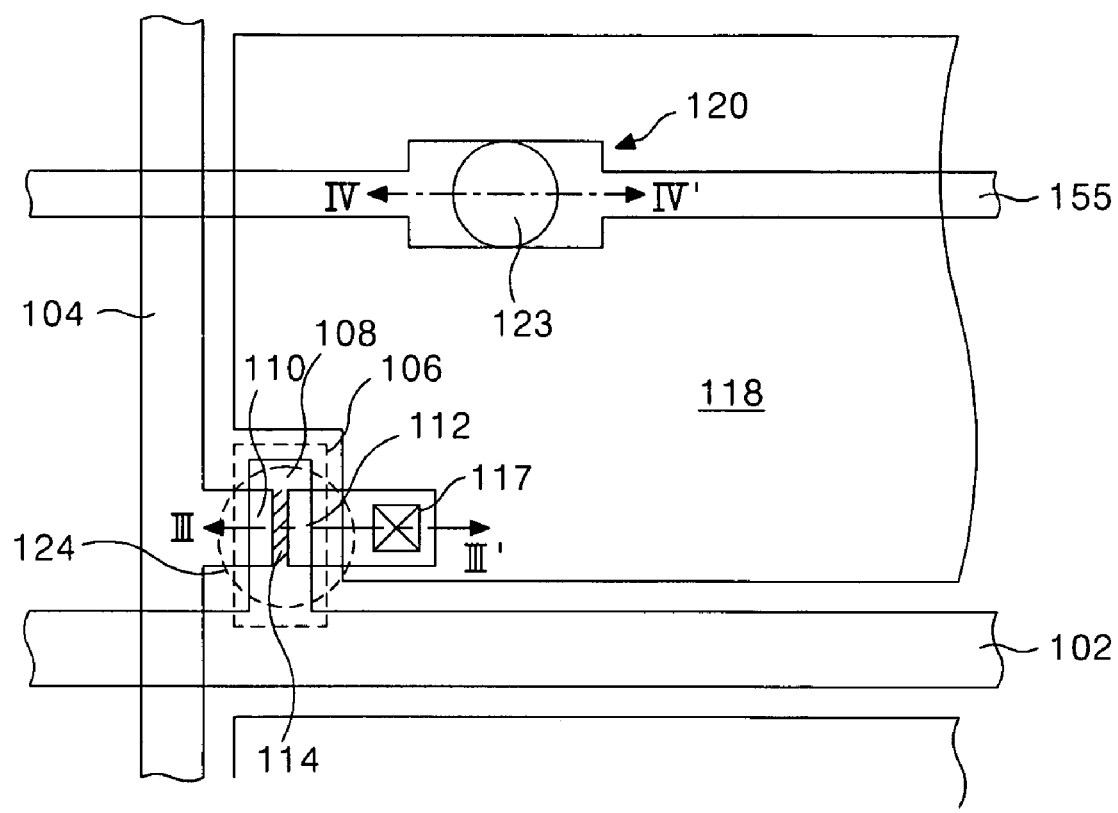
FIG. 8 is a plan view representing an LCD panel according to a second exemplary embodiment of the present invention.
Figure 9A:
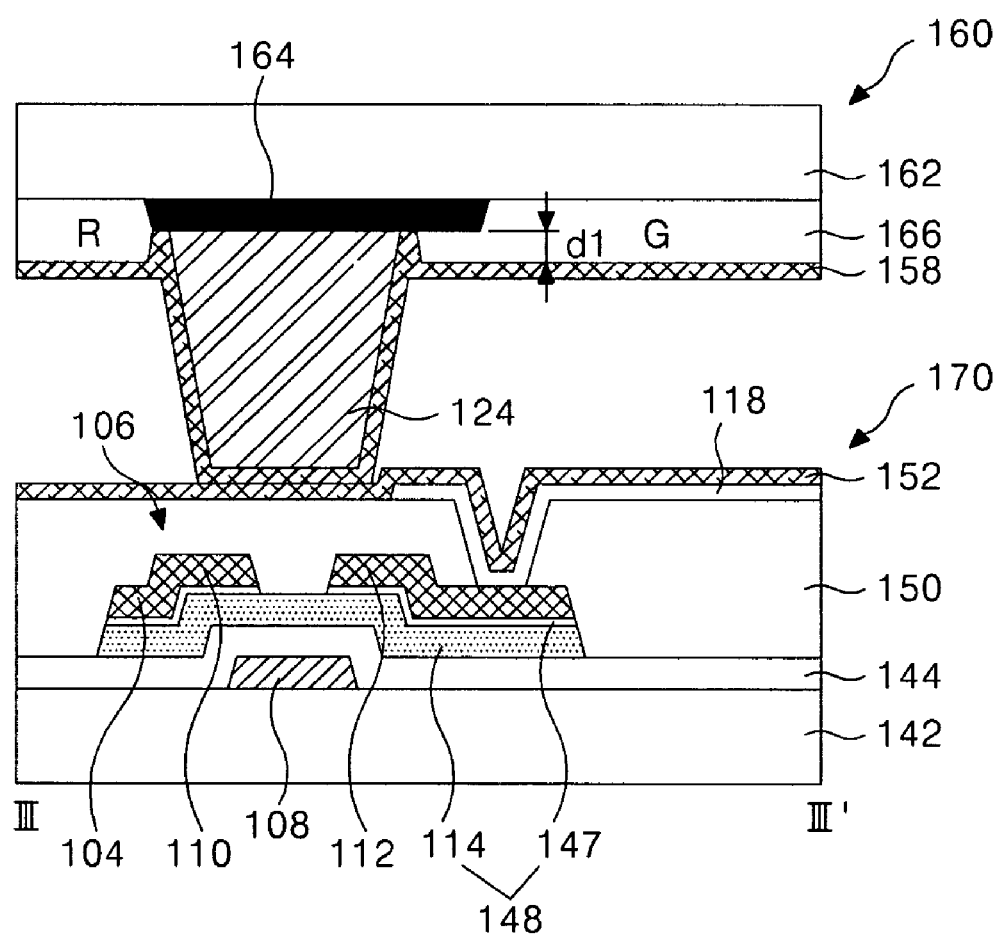
FIGS. 9A and 9B are cross sectional diagrams taken along the III-III' and IV-IV' of FIG. 8, respectively.
Figure 9B:
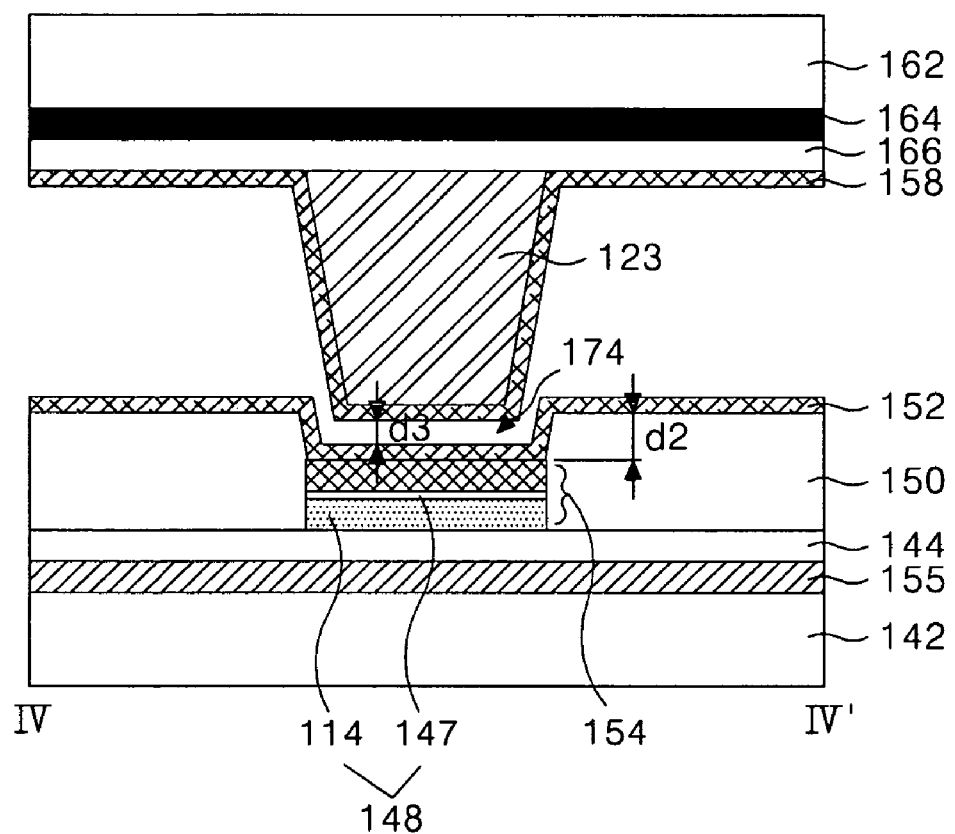

FIG. 8 is a plan view representing an LCD panel of a storage-on-common method according to a second exemplary embodiment of the present invention. FIGS. 9A and 9B are cross sectional diagrams representing the LCD panel of FIG. 8, taken along the lines III-III' and IV-IV', respectively.

The LCD panel of the storage-on-common method of FIG. 8 includes the color filter array substrate 160 and the TFT array substrate 170 with the main and auxiliary column spacers 124, 123. The color filter array substrate 160 has a similar structure to the first exemplary embodiment of the present invention, and the TFT array substrate 170 includes the storage capacitor 120 formed to cross a center of a pixel area for displaying a picture.

As shown in FIG. 9B, the storage capacitor 120 includes a storage line 155, the gate insulating film 144, and the storage upper electrode 154 made of the semiconductor pattern and the source/drain pattern formed on the lower substrate 142. The storage upper electrode 154 is exposed by a second hole 174 penetrating the organic passivation film 150 and brought in contact with the lower alignment film 152.

The LCD panel according to the second exemplary embodiment of the present invention forms a gap (d3) between the auxiliary column spacer 123 and the TFT array substrate 170 to be narrow in order to more effectively prevent a defect caused by the liquid crystal expansion and increase reliability of maintaining the cell gap. To this end, the main column spacer 124 is located to be partially inserted into the first hole 172 provided on the color filter array substrate 160 by the method of the first exemplary embodiment of the present invention, and the auxiliary column spacer 123 is arranged in a location that corresponds to the second hole 174 provided over the storage capacitor 120 of the TFT array substrate 170.

The main column spacer 124 is formed over the first hole 172 having a depth (d1) of about 2.0~2.3 μm (micrometer). The auxiliary column spacer 123 is formed above the second hole 174 of the storage capacitor 120 having a depth (d2) of about 2.5~2.8 μm. As a result, the main column spacer 124 can be brought in contact with the TFT array substrate 170 while the auxiliary column spacer 123 is made not to be in contact with the TFT array substrate by way of the second hole 174 over the storage capacitor 120. Thus, the separation gap (d3) between the auxiliary column spacer 123 and the TFT array substrate 170 is about 0.3~0.5 μm. The gap (d3) of about 0.3~0.5 μm is an optimum condition for carrying out the function of the main column spacer 124 and the auxiliary column spacer 124.

In the LCD panel according to the second exemplary embodiment of the present invention, the main column spacer 124 is partially inserted in the color filter array substrate 160 and the auxiliary column spacer 123 is partially inserted in the TFT array substrate 170. In this way, the difference of the inserted depth can be optimized for carrying out the function of the main column spacer 124 and the auxiliary column spacer 123. Thus, the cell gap maintaining function is improved and the defect problem of the liquid crystal expansion can be more effectively prevented.

The fabricating method of the LCD panel according to the second exemplary embodiment of the present invention forms the color filter array substrate 160 using the same method as the first exemplary embodiment of the present invention. The TFT array substrate 170 of the storage-on-common method is formed by a different process.

The TFT array substrate 170 of the storage-on-common method includes the organic passivation film 150 having the second hole 174 exposing the storage upper electrode 154 of the storage capacitor 120. As an alternative, the second hole 174 may be replaced by a groove (not shown) that is formed across the TFT array substrate 170 over the storage capacitors 120 to provide the gap separation between the TFT array substrate 170 and the auxiliary spacer 123.

As described above, the LCD panel and the fabricating method according to the present invention forms a first hole within the color filter array substrate and a spacer is partially inserted into the first hole to adopt a dual spacer structure in a LCD panel having an organic passivation film. Accordingly, a step difference between the spacer inserted into the first hole and a spacer that is not inserted in the first hole is formed, thereby improving the reliability of maintaining the cell gap while preventing a defect caused by liquid crystal expansion.

Further, a second hole or a groove penetrating the organic passivation film is further formed in the LCD panel of a storage-on-common method to insert all the dual spacer into the designated second hole or groove, thereby making it possible to obtain an optimum separation distance between the TFT array substrate and the auxiliary column spacer. As a result, the reliability of maintaining the cell gap can be further improved.

It will be apparent to those skilled in the art that various modifications and variations can be made in the LCD panel of the present invention and a method of fabricating the same without departing form the spirit or scope of the invention. Thus, it is intended that the present invention cover the modifications and variations of this invention provided they come within the scope of the appended claims and their equivalents.

What is claimed is:

1. A liquid crystal display panel, comprising:
a color filter array substrate including an upper substrate, a black matrix defining a cell area on the upper substrate, a color filter layer, a first column spacer, a second column spacer and an upper alignment film formed on the color filter layer, a first column spacer and the second column spacer, the first column spacer being partially inserted in a first hole defined in the color filter layer, wherein the first hole penetrates the color filter layer so that the first column spacer contacts the black matrix; and
a thin film transistor (TFT) array substrate facing the color filter array substrate and including a lower substrate, a plurality of gate lines and a plurality of data lines formed on the lower substrate to define pixel regions crossing each other with a gate insulating film therebetween, a plurality of TFTs formed in crossing areas of the gate lines and the data lines, a plurality of pixel electrodes in the pixel regions connected to the TFTs through a plurality of contact holes penetrating an organic passivation film and a lower alignment film formed on the pixel electrodes and the organic passivation film,
wherein the organic passivation film is flat at its whole region excluding the plurality of contact holes, wherein the first column spacer and the second column spacer has the same height, and the second column spacer is formed on the color filter over the black matrix
wherein the upper alignment layer on the second column spacer is in contact with the lower alignment layer on the flat surface of the organic passivation layer, wherein the TFT array substrate further includes a storage capacitor in each pixel region and a second hole penetrating the organic passivation film to expose the storage capacitor, and wherein the first column spacer corresponds to one of the TFTs and the second column spacer is located on the second hole and corresponds to the storage capacitor.

2. The liquid crystal display panel according to claim 1, wherein the first hole penetrates a red color filter to expose the black matrix.

3. The liquid crystal display panel according to claim 2, wherein at least one of a common electrode and an overcoat layer is formed between the second column spacer and the black matrix.

4. The liquid crystal display panel according to claim 1, wherein the first column spacer is in constant contact with the TFT array substrate and the second column spacer is adapted to come in contact with the TFT array substrate when an external pressure is applied.

5. A fabricating method of a liquid crystal display panel, comprising:
forming a color filter array substrate including an upper substrate, a black matrix defining a cell area on the upper substrate, a color filter layer, a first column spacer, a second column spacer and an upper alignment film formed on the color filter layer, a first column spacer and the second column spacer, the first column spacer being partially inserted in a first hole which penetrates the color filter layer so that the first column spacer contacts the black matrix, wherein the first column spacer and the second column spacer has the same height, and the second column spacer is formed on the color filter over the black matrix;
forming a thin film transistor (TFT) array substrate including a lower substrate, a plurality of gate lines and a plurality of data lines formed on the lower substrate to define pixel regions crossing each other with a gate insulating film therebetween, a plurality of TFTs formed in crossing areas of the gate lines and the data lines, a plurality of pixel electrodes in the pixel regions connected to the TFTs through a plurality of contact holes penetrating an organic passivation film and a lower alignment film formed on the pixel electrodes and the organic passivation film, wherein the organic passivation film is flat at its whole region excluding the plurality of contact holes; and
attaching the color filter array substrate with the TFT array substrate, wherein the upper alignment layer on the second column spacer is in contact with the lower alignment layer on the flat surface of the organic passivation layer after attaching, wherein the step of forming the TFT array substrate further includes forming a storage capacitor in the pixel region and forming a second hole which penetrates the organic passivation film to expose the storage capacitor, and wherein the first column spacer corresponds to one of the TFTs and the second column spacer is located on the second hole and corresponds to the storage capacitor.

6. The fabricating method according to claim 5, wherein the first hole is formed at the same time as the color filter layer to expose the black matrix.

7. The fabricating method according to claim 6, comprising: forming at least one of a common electrode and an overcoat layer between the first column spacer and the black matrix.

8. The fabricating method according to claim 5, wherein the first column spacer is in constant contact with the TFT array substrate and the second column spacer is adapted to come in contact with the TFT array substrate when an external pressure is applied.

* * * * *